United States Patent

Tokida et al.

[11] Patent Number: 5,871,854
[45] Date of Patent: Feb. 16, 1999

[54] ORGANIC ELECTROLUMINESCENT DEVICE

[75] Inventors: Akihiko Tokida, Kawagoe; Wen-Bing Kang, Tokorozawa, both of Japan; Nu Yu, Oberursel, Germany; Thomas Potrawa, Seelze, Germany; Andreas Winterfeldt, Barsinghausen, Germany

[73] Assignee: Hoechst Aktiengesellschaft, Frankfurt, Germany

[21] Appl. No.: 776,226
[22] PCT Filed: Aug. 7, 1995
[86] PCT No.: PCT/EP95/03127
  § 371 Date: Mar. 10, 1997
  § 102(e) Date: Mar. 10, 1997
[87] PCT Pub. No.: WO96/05266
  PCT Pub. Date: Feb. 22, 1996

[30] Foreign Application Priority Data

Aug. 8, 1994 [JP] Japan .................................. 6-185815
Nov. 4, 1994 [JP] Japan .................................. 6-271074

[51] Int. Cl.[6] .................................................. H05B 33/00
[52] U.S. Cl. .......................... 428/690; 428/691; 428/917; 313/504
[58] Field of Search .................................... 428/690, 691, 428/917; 313/504

[56] References Cited

U.S. PATENT DOCUMENTS 4,839,219  6/1989  Uekita et al. ............................ 428/220
5,482,921  1/1996  Seckinger et al. ...................... 504/246
5,693,693  12/1997 Auslander et al. ....................... 524/88

FOREIGN PATENT DOCUMENTS 0 314 350   5/1989   European Pat. Off. .

OTHER PUBLICATIONS

Indian Journal of Pure and Applied Physics, Jun. 1991, vol. 29, No. 6, ISSN 0019–5596.
Chemical Physics Letters, 13 Apr. 1984, vol. 106, No. 1–2, ISSN 0009–2614, pp. 124–127.
Solar Energy Materials, Feb. 1987, vol. 15, No. 2, ISSN 0165–1633, pp. 65–75.

*Primary Examiner*—Charles Nold
*Attorney, Agent, or Firm*—Frommer Lawrence & Haug LLP

[57] ABSTRACT

An organic electroluminescence device comprising an anode, an organic hole transport layer, an organic emission layer and a cathode layered in this order on a substrate, or, optionally, comprising an additional electron transport layer between the organic emission layer and the cathode, wherein the organic emission layer comprises a benzoxazinone derivative represented by formula (1), wherein $R^1$ is a specific acyl group or sulfonyl group, and $R^2$ and $R^3$ are specific substituents.

6 Claims, 2 Drawing Sheets

Emission

Emission

SUBSTITUTE SHEET (RULE 26)

ORGANIC ELECTROLUMINESCENT DEVICE

DESCRIPTION

Organic Electroluminescent Device

This invention relates to an emission device by utilizing electroluminescence of an emitting element which emits light by injection of an electric current wherein the emission device is provided with an emission layer wherein the emitting element is formed into a layer. More specifically, it relates to an organic electroluminescent device (hereinafter referred to as "organic EL device") in which the emission layer is composed of an organic compound as an emitting element.

Hithertofore, organic EL devices having various structures have been proposed. For example, a two-layer type structure wherein a thin film of a fluorescent material 2 as an emission layer and a hole transport layer 3, each comprising an organic compound and being layered on each other, are arranged between a metal cathode 1 and a transparent anode 4, as shown in FIG. 1; and a three-layer type structure wherein an electron transport layer 6 comprising an organic compound, an emission layer 2 and a hole transport layer 3 are layered between a metal cathode 1 and a transparent anode 4 are known. In the above devices, the hole transport layer 3 has the function of easily injecting positive holes from the anode and the function of blocking electrons; and the electron transport layer 6 has the function of easily injecting the electrons from the cathode and the function of blocking holes.

In these organic electroluminescent devices, ITO is mainly used for the transparent electrode 4, and a film thereof is formed on a glass substrate 5. By recombination of an electron injected from the metal cathode 1 and a hole injected into the emission layer from the anode 4, light radiated in the process of radiative decay of the produced exciton is emitted through the transparent anode and the transparent glass substrate.

Detailed explanation of organic electroluminescent devices are described, for example, in the following literature references:

(1) "Organic EL Device Development Strategy", compiled by Next Generation Display Device Research Association, Science Forum (published 1992)

(2) "Electroluminescent Materials, Devices, and Large-Screen Displays", SPIE Proceedings Vol. 1910 (1993), E. M. Conwell and M. R. Miller.

However, in the conventional organic EL devices, the stability of light emission is not necessarily considered sufficiently satisfactory, and organic EL devices which emit light more stably are desired. Under such circumstances, the present inventors extensively studied the development of organic EL devices having excellent characteristics, and, as a result, found that an organic EL device having an improved stability can be obtained by using specific benzoxazinone derivatives, and, based on this finding, completed the present invention. An object of the present invention is to provide an organic EL device which stably emits at high luminance.

The organic EL device according to the present invention is characterized in that, in the organic EL device comprising an organic compound, the emission layer comprises a benzoxazinone derivative represented by the formula (1):

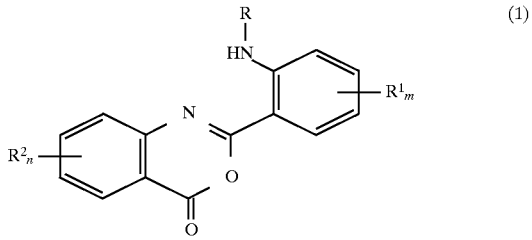

(1)

wherein R represents an electron withdrawing group, which is preferably either an acyl group represented by formula (2):

$-CO-R^3$ (2)

wherein $R^3$ represents an alkyl group having from 1 to 16 carbon atoms or an aryl group, preferably having from 4 to 10 carbon atoms, which may have a substituent, or a sulfonyl group represented by the formula (3):

$-SO_2R^4$ (3)

wherein $R^4$ represents an alkyl group having from 1 to 16 carbon atoms or an aryl group, preferably having from 4 to 10 carbon atoms, which may have a substitutent;

$R^1$, $R^2$, independently of each other, represent an alkyl, alkoxy or ester group, each having from 1 to 16 carbon atoms, an aryl- or aryloxy group, having from 4 to 10 carbon atoms, which may have one or more substituents, $-CN$, $-CF_3$, $-F$ or $-NR^5R^6$, wherein $R^5$, $R^6$ independently of each other represent an alkyl group, having from 1 to 16 carbon atoms, or an aryl group, having from 4 to 10 carbon atoms, which may have one or more substituents.

m, n are 0, 1, 2 or 3, preferably 0, 1 or 2, especially preferably 0.

In the above-described formulae (1), (2) and (3), when R is an alkyl group having from 1 to 16 carbon atoms, the alkyl group may have a straight chain or a branched chain and is preferably a methyl group, an ethyl group or a t-butyl group. When $R^1$ is an aryl group which may have a substituent, preferred groups include the phenyl group, the naphthyl group, or these aryl groups substituted with a methyl group or a t-butyl group. More preferred groups include the 4-methylphenyl group and the 4-t-butylphenyl group.

Specific examples of compounds which can be preferably used in the present invention are shown below.

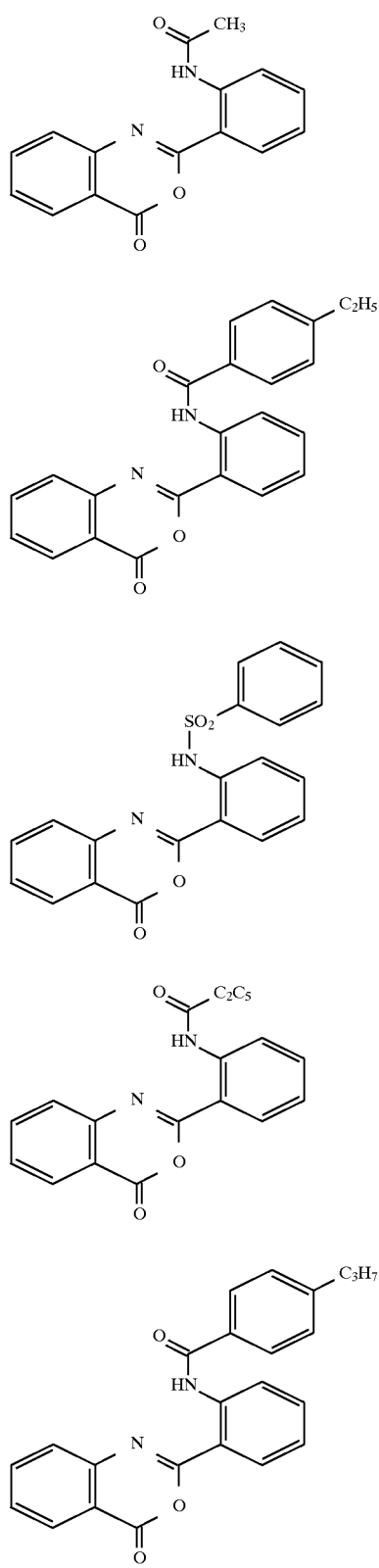

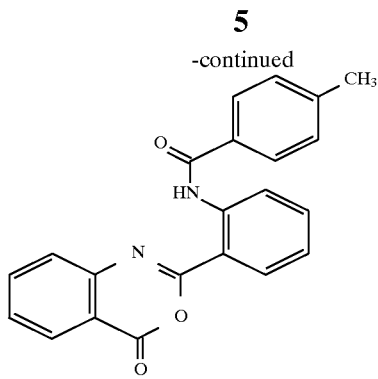

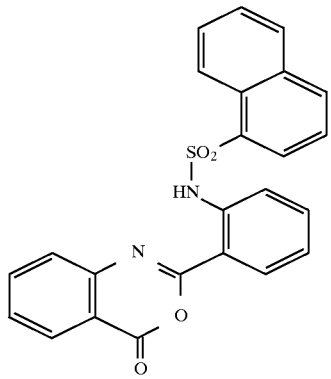

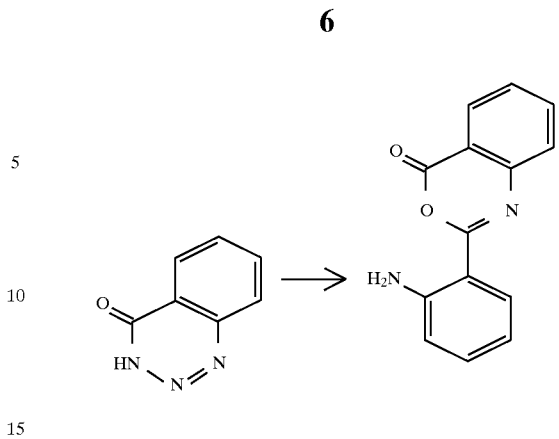

Paterson T. MCC., Smalley R. K., Suschitzky H., Barker A. J., J. Chem. Soc. Perkin Trans. 1980, Part 1, No 2, 633–638.

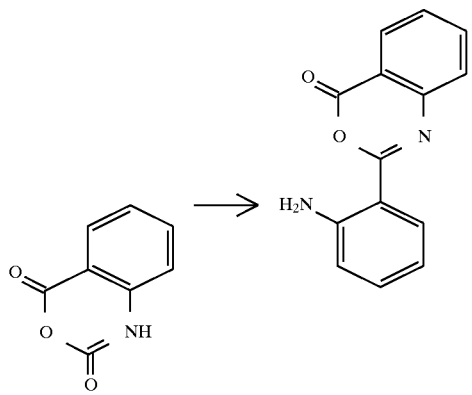

Barbooti M. M., Al-Badri H. T., Roomaya A. F., Thermochim. Acta 1983, 70, N 1–3, 347–358.

The benzoxazinone derivatives of the present invention can be used alone, or as a mixture thereof with other compounds of the present invention and compounds which are known as light-emitting materials, or as a dispersion in a polymer, for example, polyvinylcarbazole, polyester and polyimide, preferably a hole transport polymer such as polyvinylcarbazole.

The benzoxazinone compounds used in the present invention can be synthesized by conventional methods, for example, a method as described in Published European Patent Application 314350, German OLS 2209872, British Patent GB-1070326, or B. M. Bolotin et al., Proc. Int. Conf. Lumin., Vol. 1, pp. 626–631 (1966).

In the following, examples are given for synthetic procedures leading to specific compounds of the formula (I):

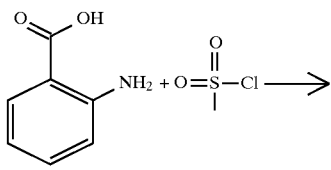

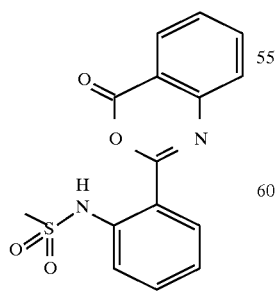

Nair M. D., Desai J. A., Indian J. Chem. 1979, B 17, No 3, 276–277.

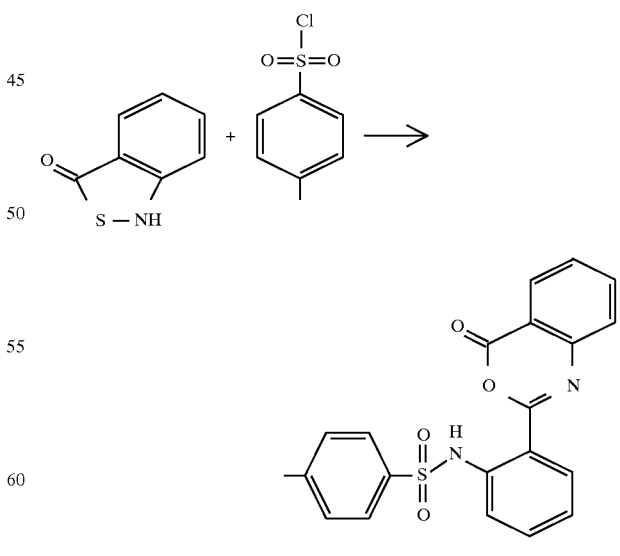

Davis M., Hook R. J., Wu Wen, Yang, J. Heterocycl. Chem. 1984, 21, N 2, 369–373.

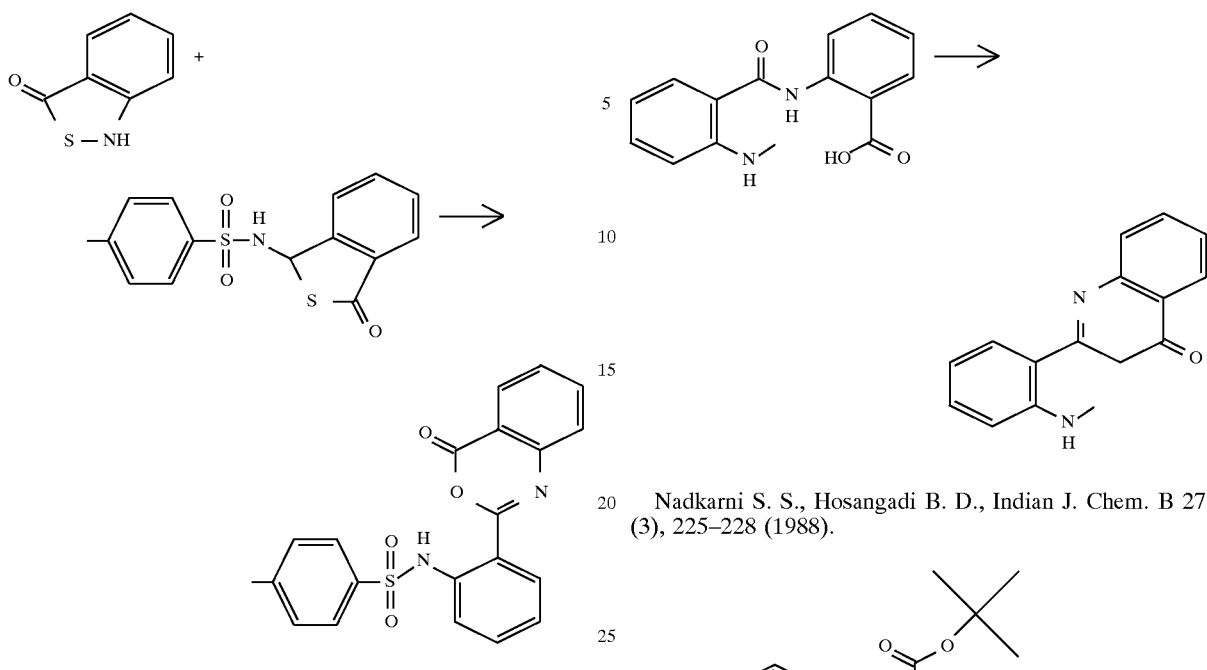
Davis M., Hook R. J., Wu Wen, Yang, J. Heterocycl. Chem. 1984, 21, N 2, 369–373.
Davis M., Hook R. J., Wu Wen, Yang, J. Heterocycl. Chem. 1984, 21, N 2, 369–373.
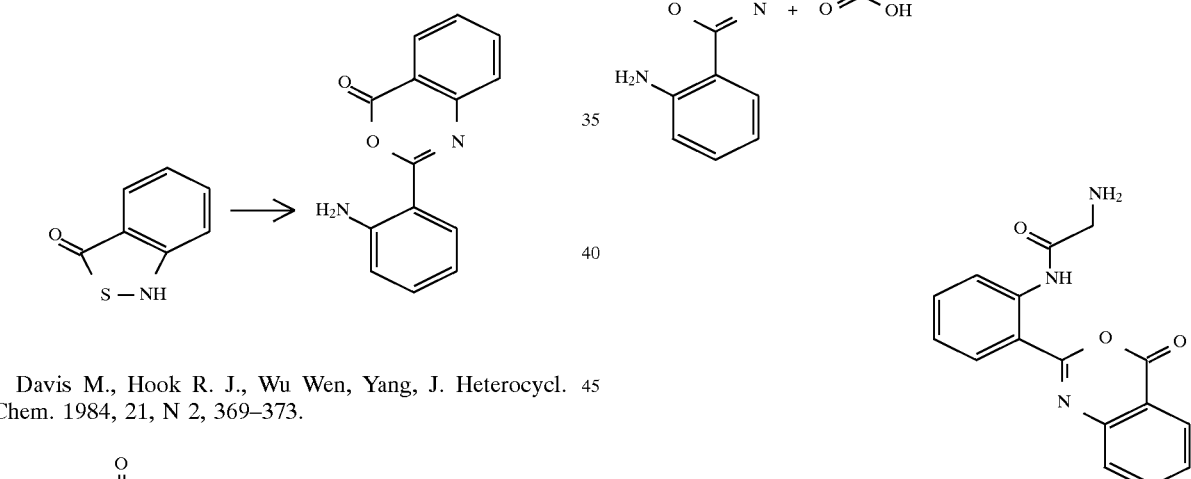
S. S. Nadkarni, B. D. Hosangadi, Indian J. Chem. [IJOCAP] 27 (3), p. 225, 1988.
Nadkarni S. S., Hosangadi B. D., Indian J. Chem. B 27 (3), 225–228 (1988).
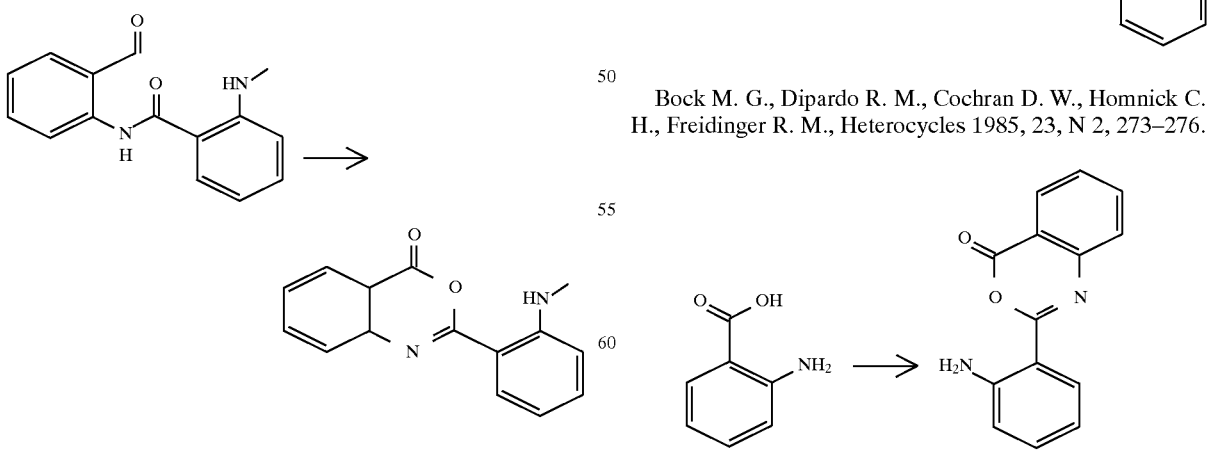
Bock M. G., Dipardo R. M., Cochran D. W., Homnick C. H., Freidinger R. M., Heterocycles 1985, 23, N 2, 273–276.
Slings S. A., Ponomarev I.I. Izv. An CCCP. Cep. XIM. 1978, HO 9, 1871–1877.

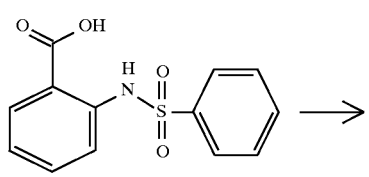

→

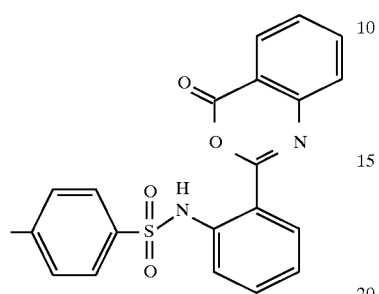

Wakankar D. M., Hosangadi B. D., Indian J. Chem. 1978, B 16, NO 5, 393–395.

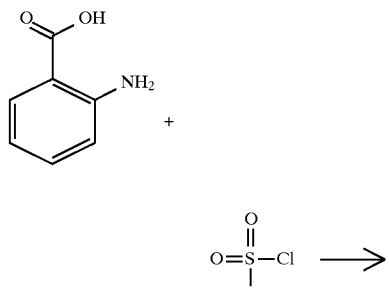

→

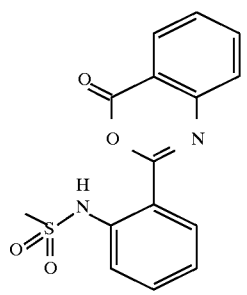

Nair M. D., Desai J. A., Indian J. Chem. 1979, B 17, No 3, 276–277.

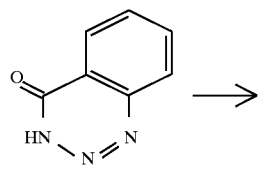

→

-continued

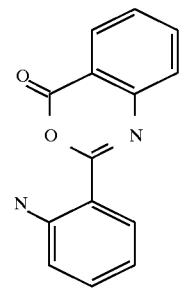

Paterson T. MCC., Smalley R. K., Suschitzky H., Barker A. J., J. Chem. Soc. Perkin Trans. 1980, Part 1, No 2, 633–638.

Examples of compounds used in the present invention are shown hereinafter, but the scope of the present invention is not limited thereto.

EXAMPLE

Figure 1:
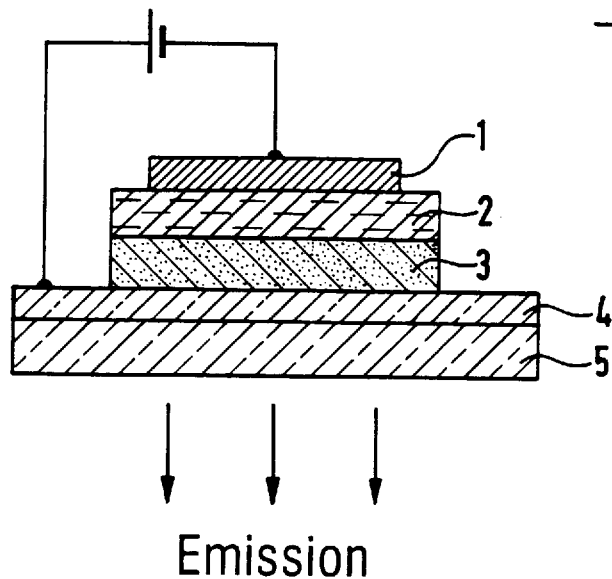
FIG. 1 depicts a cross-sectional drawing showing an example of the organic EL device in which an anode, a hole transport layer, an emission layer and a cathode are layered in this order.
Figure 2:
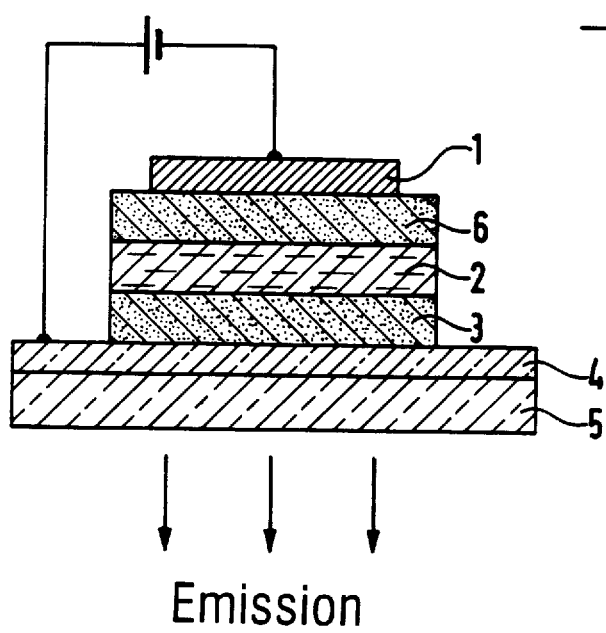
FIG. 2 depicts a cross-sectional drawing showing an example of the organic EL device in which an anode, a hole transport layer, an emission layer, an electron transport layer and a cathode are layered in this order.

An example according to the present invention is illustrated below by referring to the drawings. As shown in FIG. 1, the organic EL device of this example has a structure wherein an anode 4, a hole transport layer 3, an electron transporting emission layer 2 comprising a benzoxazinone derivative of the present invention and a metal cathode 1 are layered in this order on a glass substrate 5 (ITO glass substrate). Further, as shown in FIG. 2, in addition to the above construction, the device may have a structure wherein an electron transport layer 6 comprising an organic compound is layered between the emission layer 2 and the metal cathode 1 on the glass substrate 5.

The hole transporting compound which can be used in the hole transport layer in the above-described device structure is a compound containing a tertiary amine which has at least one bonded aromatic ring, or other low molecular weight compounds or polymeric compounds having a hole transport property and, for example, diamines represented by formula (5) (hereinafter referred to as TPD) are preferably used. In addition, compounds which are generally known as hole transporting materials can be used alone or as a mixture thereof. Typical examples of the hole transporting compounds include tetraphenylbiphenylenediamine, pyrazoline, polyvinylcarbazole and polysilane.

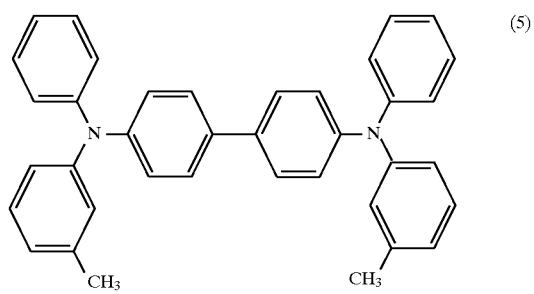

(5)

The light emitting material used in the electron transporting emission layer 2 of the device structure shown in FIG. 1 is a benzoxazinone derivative having an electron transporting property according to the present invention.

Also, the device structure shown in FIG. 2 is particularly preferred for benzoxazinone derivatives of the present invention having a relatively low electron transporting property. In this case, the compound used in the electron transport layer 6 can be a conventionally known electron transporting material. For example, t-Bu-PBD represented by formula (6) or Alq3 (Tris(8-hydroxyquinoline) aluminum) can be used.

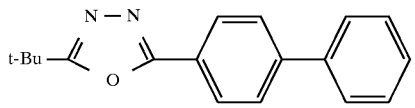
(6)

Materials for the anode used in the present invention are preferably those having a work function as high as possible, and include, for example, nickel, gold, platinum, selenium, iridium, or an alloy thereof, or tin oxide, ITO or copper iodide, the latter two being preferred. Also, an electroconductive polymer such as polyphenylene sulfide or polyaniline can be used.

On the other hand, materials for the cathode which can be used are those having a low work function such as silver, lead, tin, magnesium, aluminum, calcium, indium, chromium, lithium or an alloy thereof. Further, of the materials used as the anode and cathode, at least one of these electrodes is preferably that transmits 50% or more of the light in the region of emission wavelength of the device. The transparent substrate which can be used in the present invention includes glass and plastic film, etc.

Figure 3:
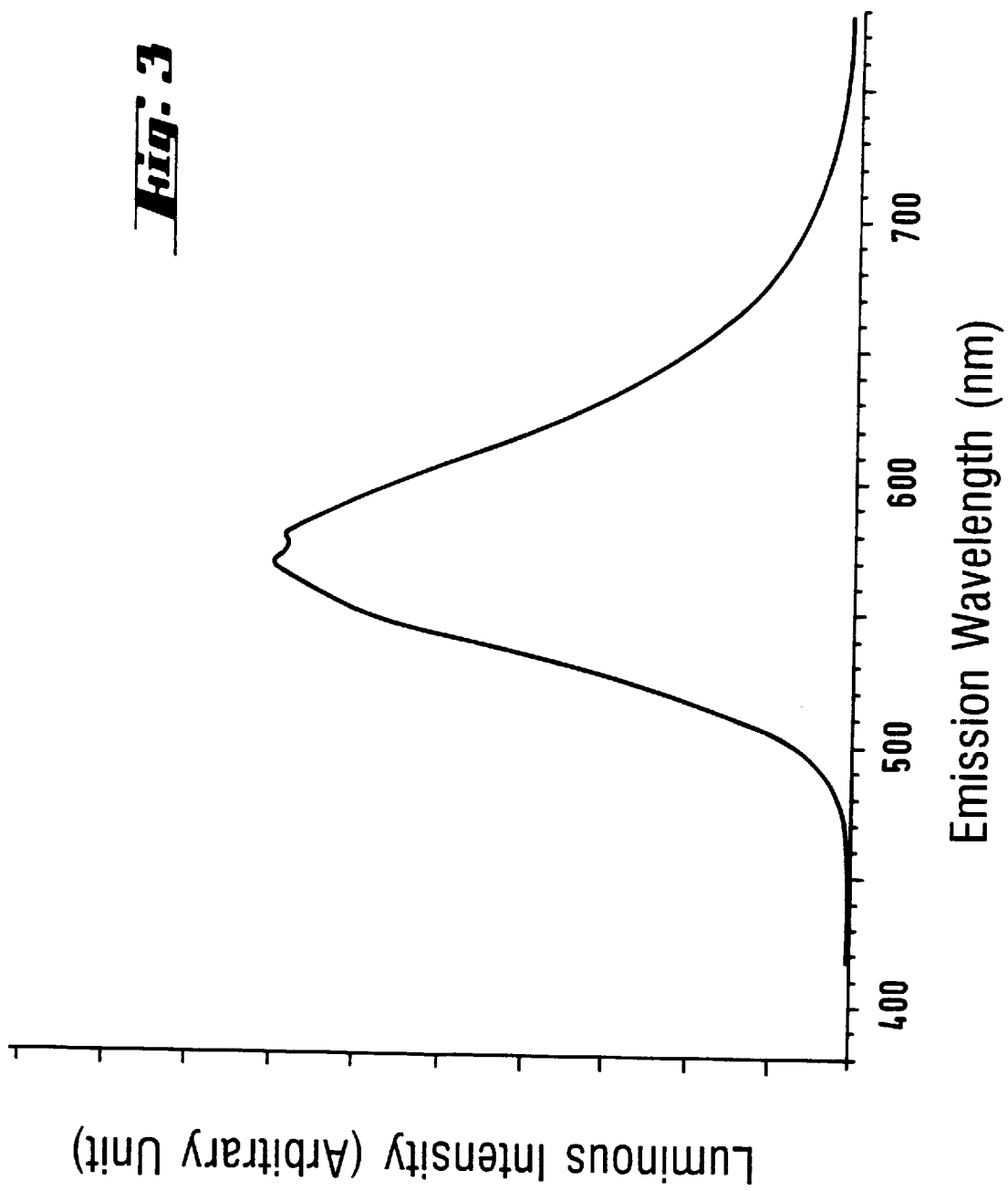
FIG. 3 depicts a graph showing the light emission spectrum of the organic EL device of the present invention.

In an embodiment, a TPD in a 50 nm thickness and then a benzoxazinone derivative represented by the formula (7) below in a 50 nm thickness were layered in a vacuum of $5 \times 10^{-5}$ torr by the resistance heating method on a well-rinsed ITO glass substrate, and, further, an aluminum electrode of 2 mm×2 mm in a 150 nm thickness was layered by vapor deposition through a mask of 2 mm×2 mm in a vacuum of $6 \times 10^{-6}$ torr. Negative and positive electric field were applied to the ITO side and the aluminum side of the device, respectively, and a luminous intensity from the ITO glass substrate of the device was measured by Color Luminometer BM-7 (Topcon Co.) and, as a result, stable yellow green electroluminescent emission having a luminance of 113 Cd/m² was observed at a voltage of 19V and an electric current density of 28 mA/cm². The light emission spectrum is shown in FIG. 3.

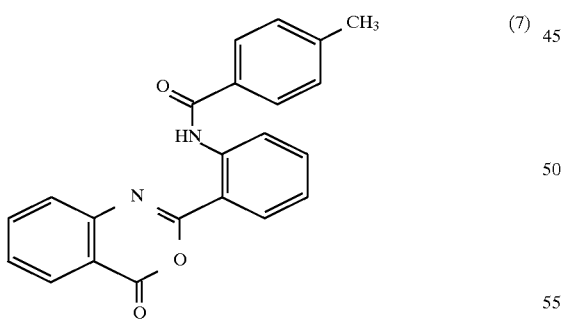
(7)

According to the present invention, an organic EL device having a good stability can be obtained by using a thin film of the benzoxazinone derivative.

What is claimed is:

1. An organic electroluminescent device wherein an anode, a hole transport layer comprising an organic compound, an emission layer comprising an organic compound, an electron transport layer, and a cathode are layered in this order, characterized in that said emission layer contains a benzoxazinone derivative represented by the formula (1):

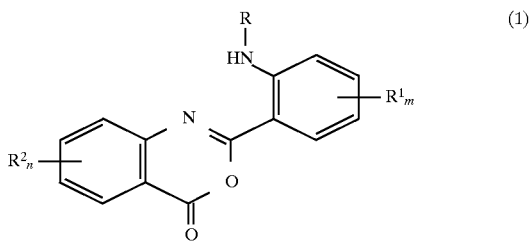
(1)

wherein R represents an electron withdrawing group;

$R^1$, $R^2$, independently of each other, represent an alkyl, alkoxy or ester group, each having from 1 to 16 carbon atoms, an aryl- or aryloxy group, having from 4 to 10 carbon atoms, which may have one or more substituents, —CN, —CF₃, —F or —NR⁵R⁶, wherein $R^5$, $R^6$ independently of each other represent an alkyl group, having from 1 to 16 carbon atoms, or an aryl group, having from 4 to 10 carbon atoms, which may have one or more substituents, and m, n are 0, 1, 2 or 3.

2. An organic electroluminescent device wherein an anode, a hole transport layer comprising an organic compound, an emission layer comprising an organic compound, and a cathode are layered in this order, characterized in that said emission layer contains a benzoxazinone derivative represented by the formula (1):

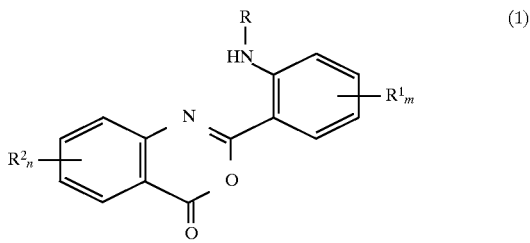
(1)

wherein R represents an electron withdrawing group;

$R^1$, $R^2$, independently of each other, represent an alkyl, alkoxy or ester group, each having from 1 to 16 carbon atoms, an aryl- or aryloxy group, having from 4 to 10 carbon atoms, which may have one or more substituents, —CN, —CF₃, —F or —NR⁵R⁶, wherein $R^5$, $R^6$ independently of each other represent an alkyl group, having from 1 to 16 carbon atoms, or an aryl group, having from 4 to 10 carbon atoms, which may have one or more substituents, and m, n are 0, 1, 2 or 3.

3. The electroluminescent device as claimed in claim 1, wherein R in the formula (1) is either an acyl group represented by formula (2):

—CO—R³ (2)

wherein $R^3$ represents an alkyl group having from 1 to 16 carbon atoms or an aryl group, which may have a substituent, or a sulfonyl group represented by the formula (3):

—SO₂R⁴ (3)

wherein $R^4$ represents an alkyl group having from 1 to 16 carbon atoms or an aryl group, which may have a substitutent.

4. The electroluminescent device as claimed in claim 2, wherein R in the formula (1) is either an acyl group represented by formula (2):

$$-CO-R^3 \quad (2)$$

wherein $R^3$ represents an alkyl group having from 1 to 16 carbon atoms or an aryl group, which may have a substituent, or a sulfonyl group represented by the formula (3):

$$-SO_2R^4 \quad (3)$$

wherein $R^4$ represents an alkyl group having from 1 to 16 carbon atoms or an aryl group, which may have a substitutent.

5. The electroluminescent device as claimed in claim 1, wherein m, n in the formula (1) are 0.

6. The electroluminescent device as claimed in claim 2, wherein m, n in the formula (1) are 0.

* * * * *